(12) United States Patent
Yamamoto et al.

(10) Patent No.: US 11,824,334 B2
(45) Date of Patent: Nov. 21, 2023

(54) WIRING MEMBER

(71) Applicant: Sumitomo Wiring Systems, Ltd., Yokkaichi (JP)

(72) Inventors: Hironobu Yamamoto, Yokkaichi (JP); Kyungwoo Kim, Yokkaichi (JP); Toshinari Kobayashi, Yokkaichi (JP); Moriyuki Shimizu, Yokkaichi (JP); Yukitoshi Terasaka, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 17/759,152

(22) PCT Filed: Jan. 6, 2021

(86) PCT No.: PCT/JP2021/000163
§ 371 (c)(1),
(2) Date: Jul. 20, 2022

(87) PCT Pub. No.: WO2021/149487
PCT Pub. Date: Jul. 29, 2021

(65) Prior Publication Data
US 2023/0050384 A1 Feb. 16, 2023

(30) Foreign Application Priority Data
Jan. 21, 2020 (JP) ................. 2020-007458

(51) Int. Cl.
*H02G 15/04* (2006.01)
*B60R 16/02* (2006.01)
(52) U.S. Cl.
CPC .......... *H02G 15/04* (2013.01); *B60R 16/0207* (2013.01); *B60R 16/0215* (2013.01)

(58) Field of Classification Search
CPC ... B60R 16/0207; B60R 16/0215; H01B 7/28; H01B 7/2806; H01B 7/282
See application file for complete search history.

(56) References Cited

U.S. PATENT DOCUMENTS 9,312,677 B2 * 4/2016 Aase ................. H02G 15/18
10,807,543 B2 * 10/2020 Toyoshima ............ H02G 3/22
(Continued)

FOREIGN PATENT DOCUMENTS

| CN | 107945999 A | * | 4/2018 | ............. H01B 13/24 |
| JP | 2001-229995 A | | 8/2001 | |

(Continued)

OTHER PUBLICATIONS

International Search Report, Application No. PCT/JP2021/000163, dated Feb. 22, 2021. ISA/Japan Patent Office.

*Primary Examiner* — Paresh Paghadal
(74) *Attorney, Agent, or Firm* — Honigman LLP

(57) ABSTRACT

A wiring member includes: a main line portion in which a plurality of electric wires are gathered; a plurality of branch line portions formed by branching the plurality of electric wires from an end portion of the main line portion; a water sealing portion that closes a gap between the plurality of branch line portions at a branch portion where the plurality of branch line portions branch from the end portion of the main line portion; and a resin portion molded to cover the water sealing portion in a state in which the resin portion is in close contact with an outer peripheral portion of the main line portion adjacent to the branch portion and outer peripheral portions of the plurality of branch line portions adjacent to the branch portion.

4 Claims, 3 Drawing Sheets

(56) References Cited

U.S. PATENT DOCUMENTS

| 2017/0154706 | A1* | 6/2017 | Yamamoto | H01B 7/285 |
| 2017/0162299 | A1* | 6/2017 | Komori | H01R 13/52 |
| 2019/0344733 | A1* | 11/2019 | Toyoshima | H02G 3/0406 |

FOREIGN PATENT DOCUMENTS

| JP | 2016-134369 A | 7/2016 |
| JP | 2018-125122 A | 8/2018 |

* cited by examiner

WIRING MEMBER

CROSS-REFERENCE TO RELATED APPLICATIONS

This application is the U.S. national stage of PCT/JP2021/000163 filed on Jan. 6, 2021, which claims priority of Japanese Patent Application No. JP 2020-007458 filed on Jan. 21, 2020, the contents of which are incorporated herein.

TECHNICAL FIELD

The present disclosure relates to a wiring member.

BACKGROUND

JP 2017-98143A discloses a conductive path that includes one main path and two branch paths that are branched from a distal end portion of the main path. JP 2017-98143A discloses that the main path is formed by collectively embedding a plurality of electric wires in a sheath made of synthetic resin, and that a cap through which the electric wires pass is attached to a front end portion of the sheath.

Disclosure

It is desired that the effect of suppressing entry of water into a gap between a plurality of branch line portions at the portion where the plurality of branch line portions branch from the main line portion is further improved.

An object of the present disclosure is to further improve an effect of suppressing entry of water that passes through a gap between a plurality of branch line portions at a branch portion where the branch line portions branch from a main line portion.

SUMMARY

A wiring member of the present disclosure includes: a main line portion in which a plurality of electric wires are gathered; a plurality of branch line portions formed by branching the plurality of electric wires from an end portion of the main line portion; a water sealing portion that closes a gap between the plurality of branch line portions at a branch portion where the plurality of branch line portions branch from the end portion of the main line portion; and a resin portion that is molded to cover the water sealing portion in a state in which the resin portion is in close contact with an outer peripheral portion of the main line portion adjacent to the branch portion and outer peripheral portions of the plurality of branch line portions adjacent to the branch portion.

Advantageous Effects

According to the present disclosure, the water sealing portion that is covered with the resin portion closes a gap between the plurality of branch line portions in the branch portion. With this configuration, in the branch portion where the plurality of branch line portions branch from the main line portion, the effect of suppressing entry of water that passes through the gap between the branch line portions is further improved.

DETAILED DESCRIPTION OF PREFERRED EMBODIMENTS

Figure 1:
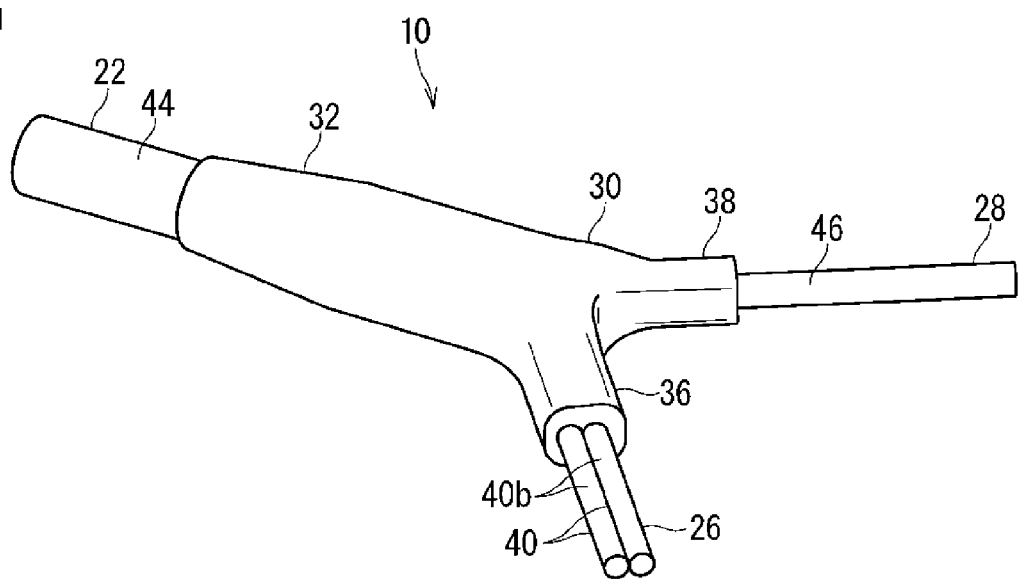
FIG. 1 is a perspective view showing a wiring member according to a first embodiment.

Embodiments of the present disclosure are first listed and described.

The wiring member of the present disclosure is as follows.

First Aspect

A wiring member according to a first aspect includes: a main line portion in which a plurality of electric wires are gathered; a plurality of branch line portions formed by branching the plurality of electric wires from an end portion of the main line portion; a water sealing portion that closes a gap between the plurality of branch line portions at a branch portion where the plurality of branch line portions branch from the end portion of the main line portion; and a resin portion that is molded to cover the water sealing portion in a state in which the resin portion is in close contact with an outer peripheral portion of the main line portion adjacent to the branch portion and an outer peripheral portion of the plurality of branch line portions adjacent to the branch portion. According to this wiring member, the water sealing portion that is covered with the resin portion closes a gap between the plurality of branch line portions in the branch portion. With this configuration, in the branch portion where the plurality of branch line portions branch from the main line portion, the effect of suppressing entry of water that passes through the gap between the branch line portions is further improved.

Second Aspect

In a second aspect, the wiring member according to the first aspect, the water sealing portion may be a portion molded to close the gap between the plurality of branch line portions using the branch portion as an insert portion. In this case, because the water sealing portion is a portion molded so as to close the gap between the plurality of branch line portions using the branch portion as the insert portion, the water sealing portion is formed in a shape following the space of the plurality of branch line portions. With this configuration, the effect of suppressing entry of water that passes through the gap between the branch line portions is further improved.

Third Aspect

In a third aspect, the wiring member according to the first or the second aspects, the main line portion may include a sheath that covers the plurality of electric wires, an end portion of the sheath may be open toward the branch portion, and the water sealing portion may cover the end portion of the sheath. In this case, because the water sealing portion covers the end portion of the sheath, the effect of suppressing entry of water into the sheath is improved.

Fourth Aspect

In a fourth aspect, the wiring member according to any one of the first to the third aspects, a recessed portion that partially exposes at least one line portion among the main line portion and the plurality of branch line portions is formed in the resin portion. In this case, a mark of a positioning pin at the time of forming the resin portion remains as the recessed portion that partially exposes at least one line portion among the main line portion and the plurality of branch line portions. For this reason, the water sealing portion is less likely to be exposed to the outside, and the effect of suppressing entry of water that passes through the gaps between the branch line portions is further improved.

Specific examples of a wiring member of the present disclosure will be described below with reference to the drawings. Note that the present disclosure is not limited to these examples, but is defined by the scope of the claims, and is intended to include all modifications within the meaning and scope equivalent to the scope of the claims.

EMBODIMENTS

Figure 2:
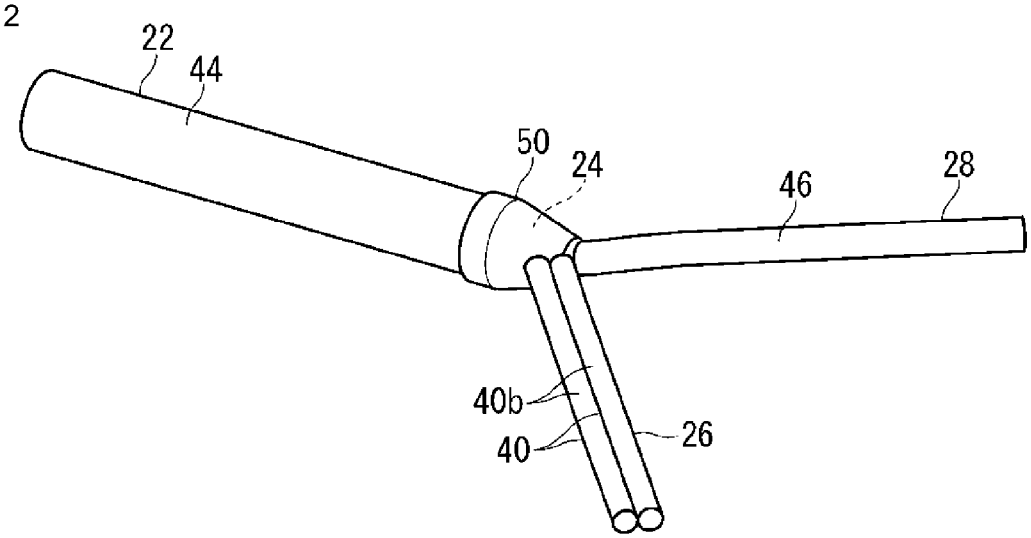
FIG. 2 is a perspective view showing a state in which a resin portion is omitted in the wiring member.
Figure 3:
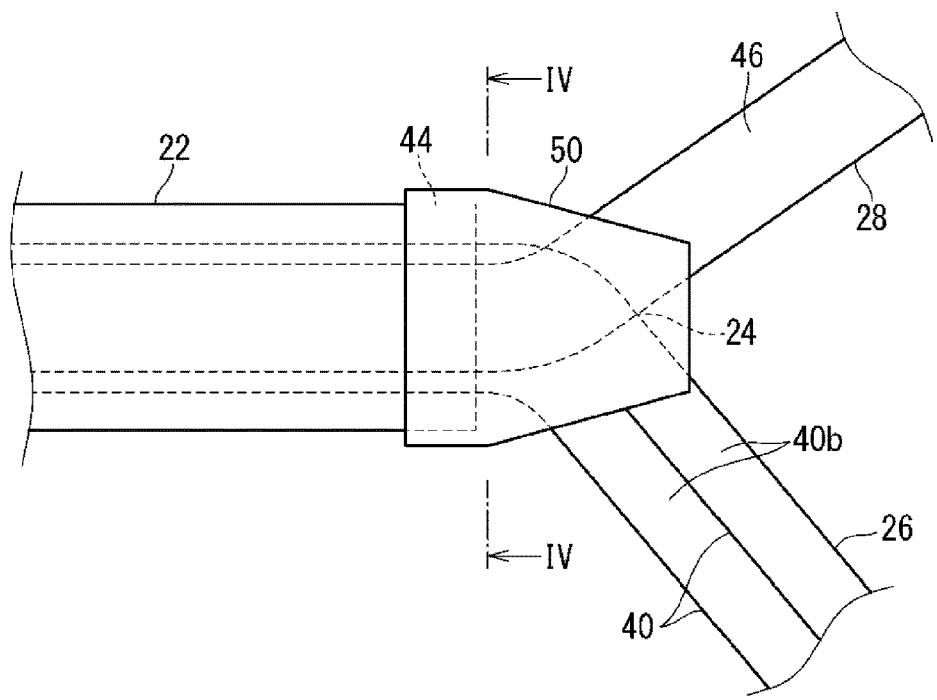
FIG. 3 is a plan view showing a state in which the resin portion is omitted in the wiring member.
Figure 4:
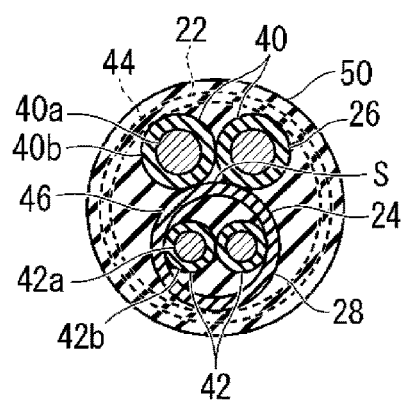
FIG. 4 is a cross-sectional view taken along line IV-IV in FIG. 3.

Hereinafter, a wiring member according to an embodiment will be described. FIG. 1 is a perspective view showing the wiring member according to the embodiment. FIG. 2 is a perspective view showing a state in which a resin portion is omitted in the wiring member. FIG. 3 is a plan view showing a state in which the resin portion is omitted in the wiring member. FIG. 4 is a cross-sectional view taken along line IV-IV in FIG. 3.

A wiring member 10 includes a main line portion 22, a plurality of branch line portions 26 and 28, a resin portion 30, and a water sealing portion 50.

The main line portion 22 and the plurality of branch line portions 26 and 28 are each constituted by a plurality of electric wires. The plurality of electric wires may be two or more of electric wires. In the present embodiment, an example in which the plurality of electric wires include two electric wires 40 and two electric wires 42 will be described.

The electric wires 40 each include a core wire 40a and a covering 40b that covers the periphery of the core wire 40a. The core wire 40a is a conductive wire made of copper, copper alloy, aluminum, aluminum alloy, or the like. The core wire 40a may be a single wire, or may also be a twisted wire. The covering 40b is an insulating covering made of resin or the like, and is formed by extrusion covering or the like of the resin around the core wire 40a. The covering 40b is made of, for example, polyethylene. The electric wires 40 are power supply lines that transmit electric power, for example. When the wiring member 10 is installed in a vehicle, for example, the electric wires 40 may be power supply lines that supply electric power to an electric parking brake (EPB) or an electro-mechanical brake (EMB).

Similar to the electric wires 40, the electric wires 42 each include a core wire 42a and a covering 42b (made of polyethylene, for example) that covers the core wire 42a. The electric wires 42 are signal lines that transmit signals, for example. When the wiring member 10 is installed in a vehicle, the electric wires 42 may be signal lines that transmit signals from a sensor for detecting the speed of a wheel in an anti-lock brake system (ABS). In the present embodiment, the electric wires 42 are thinner than the electric wires 40.

The two electric wires 42 may be covered with a sheath 46. The sheath 46 is an insulating covering made of resin or the like, and is formed by extrusion covering or the like of resin around the two electric wires 42. The sheath 46 is made of polyurethane, for example. The two electric wires 42 may also be covered with a protective member such as a corrugated tube, a bendable tube, or a wound adhesive tape, instead of the sheath 46. The sheath 46 may also be omitted.

The plurality of electric wires 40 and 42 are covered with a sheath 44. The sheath 44 is an insulating covering made of resin or the like, and is formed by extrusion covering or the like of resin around the plurality of electric wires 40 and 42. The sheath 44 is made of polyurethane, for example. The plurality of electric wires 40 and 42 may also be covered with a protective member such as a corrugated tube, a bendable tube, or a wound adhesive tape, instead of the sheath 44. The sheath 44 may also be omitted.

The sheath 44 covers a portion close to one end of the plurality of electric wires 40 and 42 (a portion close to left in FIGS. 1 to 3). The opening on one side of the sheath 44 is positioned in the middle in the extending direction of the plurality of electric wires 40 and 42. The plurality of electric wires 40 and 42 are bundled into one at the portion at which the sheath 44 is provided. In this manner, the portion where the plurality of electric wires 40 and 42 are gathered is a main line portion 22.

The plurality of electric wires 40 and 42 extend from the opening on one side of the sheath 44, and branch in different directions. In the present embodiment, the plurality of electric wires 40 and 42 are branched into two electric wires 40 and two electric wires 42 from the opening on one side of the sheath 44. The opening on one side of the sheath 44 is positioned at an end portion on one side of the main line portion 22, and portions formed by branching the plurality of electric wires 40 and 42 from the end portion of the main line portion 22 are a plurality of branch line portions 26 and 28, respectively. In the present embodiment, the two electric wires 40 constitute a first branch line portion 26, and the two electric wires 42 constitute a second branch line portion 28. The branch line portions 26 and 28 extend in different directions from the end of the main line portion 22. The end portion of the sheath 44 opens toward a branch portion 24 where the plurality of branch line portions 26 and 28 branch from the end portion of the main line portion 22.

End portions of the electric wires 40 and 42 are connected to electric components such as an electric control unit, a motor, and a sensor directly or via a connector or the like. The wiring member 10 may be used as a composite harness including a plurality of types of electric wires. As described above, when the electric wires 40 are power supply lines and the electric wires 42 are signal lines, the wiring member 10 is a composite harness including the power supply lines (the electric wires 40) and the signal lines (the electric wires 42). In particular, when the electric wire 10 includes the power supply lines (the electric wires 40) for an electric brake and the signal lines (the electric wires 42) for a sensor that performs vehicle speed detection or the like, the wiring member 10 is a composite harness for a brake.

The water sealing portion 50 closes a gap between the plurality of branch line portions 26 and 28 at the branch portion 24. In the present embodiment, the second branch line portion 28 includes a sheath 46 that covers the two electric wires 42. Accordingly, the gap between the plurality of branch line portions 26 and 28 is a gap S between the outer peripheral surfaces of the two electric wires 40 and the outer peripheral surface of the sheath 46, and the water sealing portion 50 closes the gap S (see FIG. 4). The water sealing portion 50 may have a shape conforming to the outer shape of the plurality of branch line portions 26 and 28 at a portion between the branch line portions 26 and 28 to fill the gap S. In a case where the first branch line portion 26 and the second branch line portion 28 are in direct contact with each other, there may be a case where a portion of the water sealing portion 50 does not exist at the contact portion. Such a case is also included in a case where the water sealing portion 50 closes the gap between the plurality of branch line portions 26 and 28.

The water sealing portion 50 is made of polyurethane, for example. The water sealing portion 50 may cover an end portion on one side of the sheath 44. More specifically, the water sealing portion 50 may cover the outer periphery of the end portion on one side of the sheath 44. With this configuration, the opening of the sheath 44, in particular, the gaps between the inner peripheral edge of the opening of the sheath 44 and the outer peripheral surfaces of the electric wires 40 and the sheath 46 are closed by the water sealing portion 50, and the effect of suppressing entry of water into the sheath 44 is improved.

Such a water sealing portion 50 may be formed by molding the branch portion 24 as an insert portion to close the gap between the plurality of branch line portions 26 and 28. The water sealing portion 50 may be formed at a limited location near the proximal end portions of the plurality of branch line portions 26 and 28. The water sealing portion 50 may be formed in a limited location compared with the resin portion 30. Accordingly, at the time of molding, the branch portion 24 can be easily disposed at a fixed position with high accuracy. This makes it easy to supply the molten resin between the portion between the branch line portions 26 and 28 in a targeted flow. In addition, in the mold, the distance between the supply port of the molten resin and the gap between the plurality of branch line portions 26 and 28 is shortened, and from this point as well, the molten resin is easily supplied to the gap between the plurality of branch line portions 26 and 28.

The resin portion 30 is a portion molded to cover the water sealing portion 50 in a state of being in close contact with the outer peripheral portion of the main line portion 22 adjacent to the branch portion 24 and the outer peripheral portions of the plurality of branch line portions 26 and 28 adjacent to the branch portion 24. The resin portion 30 is formed by, for example, molding the water sealing portion 50, the end portion of the main line portion 22, and the base end portions of the plurality of branch line portions 26 as insert portions.

The resin portion 30 is made of a resin, for example, polyurethane. When the water sealing portion 50 and the resin portion 30 are made of the same resin, for example, polyurethane, the water sealing portion 50 and the resin portion 30 are integrated, and water is less likely to enter the boundary therebetween. The water sealing portion 50 may be made of the same resin as the constituent resin of the outer peripheral portion of any one of the main line portion 22 and the plurality of branch line portions 26 and 28. The resin portion 30 may be made of the same resin as the constituent resin of the outer peripheral portion of any one of the main line portion 22 and the plurality of branch line portions 26 and 28. When the water sealing portion 50 or the resin portion 30 is made of the same resin as the constituent resin of the outer peripheral portion of any one of the main line portion 22 and the plurality of branch line portions 26 and 28, water is less likely to enter between them. The resin portion 30 and the water sealing portion 50 may be made of polyurethane, and the sheaths 44 and 46 may also be made of polyurethane, for example. In this case, the resin portion 30 and the water sealing portion 50 adhere well to the sheath 46 of the main line portion 22 and the sheath 46 of the second branch line portion 28, and water flowing along the main line portion 22 and the second branch line portion 28 is less likely to enter the branch portion 24.

The resin portion 30 covers the entire outer periphery of the water sealing portion 50. The resin portion 30 covers the entire periphery of the end portion of the sheath 44 in the main line portion 22. The resin portion 30 covers the entire periphery of portions adjacent to the water sealing portion 50 of the electric wires 40 constituting the first branch line portion 26. The resin portion 30 covers the entire periphery of a portion adjacent to the water sealing portion 50 of the sheath 46 constituting the second branch line portion 28. A portion of the resin portion 30 that covers the main line portion 22 may be referred to as a main line side extension portion 32. A portion of the resin portion 30 that covers the first branch line portion 26 may be referred to as a first branch side extension portion 36, and a portion of the resin portion 30 that covers the second branch line portion 28 may be referred to as a second branch side extension portion 38.

The first branch side extension portion 36 and the second branch side extension portion 38 extend in different directions with respect to the main line side extension portion 32. In the present embodiment, the first branch side extension portion 36 and the second branch side extension portion 38 extend to form a T shape with respect to the main line side extension portion 32. The main line portion 22 is held along a fixed path by the main line side extension portion 32, the first branch line portion 26 is held to extend along a fixed direction by the first branch side extension portion 36, and the second branch line portion 28 is held to extend along a fixed direction by the second branch side extension portion 38. The resin portion 30 regulates the directions in which the branch line portions 26 and 28 branch and extend with respect to the main line portion 22.

According to the wiring member 10 configured as described above, the water sealing portion 50 that is covered with the resin portion 30 closes the gap between the plurality of branch line portions 26 and 28 in the branch portion 24. With this configuration, in the branch portion 24 in which the plurality of branch line portions 26 and 28 branch from the main line portion 22, it is possible to further improve the effect of suppressing entry of water that passes through the portion between the branch line portions 26 and 28.

For example, even in a case where the resin portion 30 and any of the covering portions are made of different resins (for example, in a case where the resin portion 30 is made of polyurethane and the covering 40*b* is made of polyethylene), it is possible to suppress the transfer of water to the main line portion 22 due to the double water sealing structure of the resin portion 30 and the water sealing portion 50.

In addition, because the water sealing portion 50 is a portion molded to close the gap between the branch line portions 26 and 28 using the branch portion 24 as an insert portion, the water sealing portion 50 is formed in a shape following the space of the plurality of branch line portions 26 and 28. This configuration further improves the effect of suppressing entry of water that passes through the gap between the branch line portions 26 and 28.

In addition, because the water sealing portion 50 covers the end portion of the sheath 44, the effect of suppressing the entry of water into the sheath 44 is further improved, and the entry of water into the main line portion 22 is further suppressed.

Modification

Hereinafter, modifications will be described.

In the above-described embodiment, an example in which the four electric wires 40 and 42 are branched into two branch lines is described. However, the number of electric wires may be two or more. Furthermore, the number of branch lines may be two or more, and for example, the electric wires may be branched into three or more branch lines. In this case, the water sealing portion may close at least one gap between the three branch line portions, or may close all the gaps.

At least one of the covering and the sheath of each electric wire may be provided with an electromagnetic shield layer made of a metal braid, a metal tape, or the like.

Figure 5:
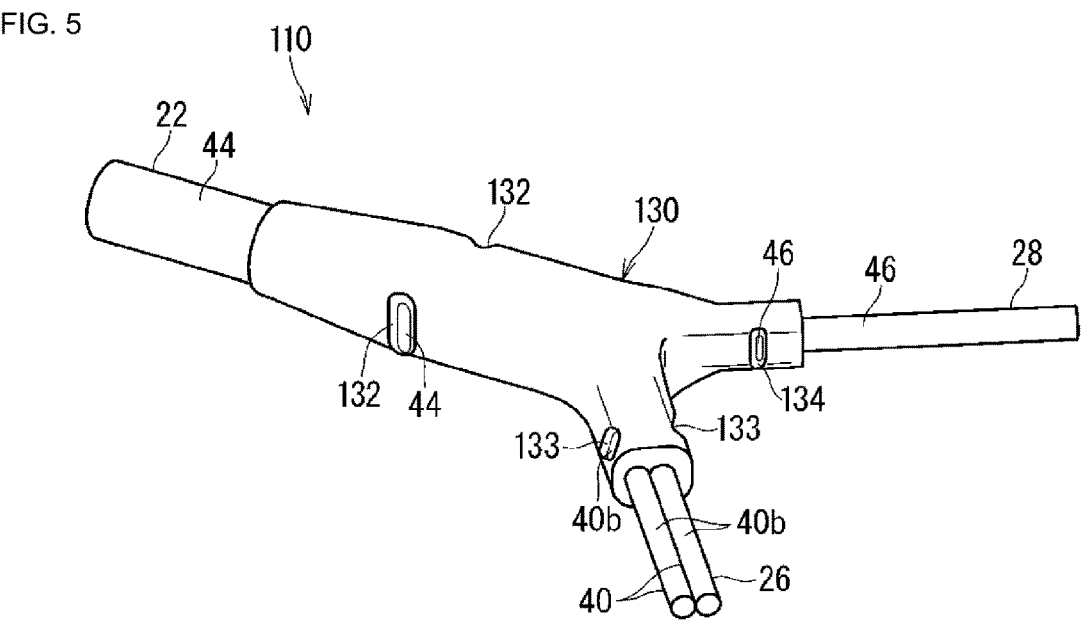
FIG. 5 is a perspective view showing a wiring member according to a modification.

As in a wiring member 110 according to a modification shown in FIG. 5, recessed portions 132, 133, and 134 that partially expose at least one line portion among the main line portion 22 and the plurality of branch line portions 26 and 28 may be formed in a resin portion 130 corresponding to the resin portion 30.

The recessed portion 132 is formed to partially expose the outer periphery of the main line portion 22 (in this case, the outer periphery of the sheath 44) of the resin portion 130. Two recessed portion 132 are formed on both sides of a portion of the resin portion 130 that covers the main line portion 22, for example. Each of the recessed portions 132 is formed in a long groove shape in a direction orthogonal to the longitudinal direction of the main line portion 22. The sheath 44, which is a part of the main line portion 22, is exposed on the bottom sides of the recessed portions 132. The pair of recessed portions 132 may be formed as marks where positioning pins for positioning the main line portion 22 are arranged when the resin portion 130 is molded. Another pair of recessed portions orthogonal to the pair of recessed portions 132 may be formed in a portion of the resin portion 130 that covers the main line portion 22. When the pair of recessed portions 132 and the other pair of recessed portions are formed, the main line portion 22 can be positioned in two orthogonal directions.

A pair of recessed portions 133 are formed on both side portions of a portion of the resin portion 130 that covers the branch line portion 26. A pair of recessed portions 134 are formed on both side portions of a portion of the resin portion 130 that covers the branch line portion 28. As for the pair of recessed portions 133 and the pair of recessed portions 134, another pair of recessed portions may be formed in the same manner as described above.

Recessed portions do not need to be formed in all of the main line portion 22 and the plurality of branch line portions 26 and 28. If at least one recessed portion is formed in at least one line portion among the main line portion 22 and the plurality of branch line portions 26 and 28, the recessed portion can be used as a mark for a positioning pin.

According to the present modification, the marks of the positioning pins used when the resin portion 130 is formed remain as the recessed portions 132, 133, and 134 that partially expose at least a part of the main line portion 22 and the plurality of branch line portions 26 and 28. With this configuration, the water sealing portion 50 is kept in a state of being covered with the resin portion 130, and is less likely to be exposed to the outside. As a result, the main line portion 22 and the branch line portions 26 and 28 are accurately positioned, and the effect of suppressing entry of water that passes through the branch line portions 26 and 28 is improved.

Figure 6:
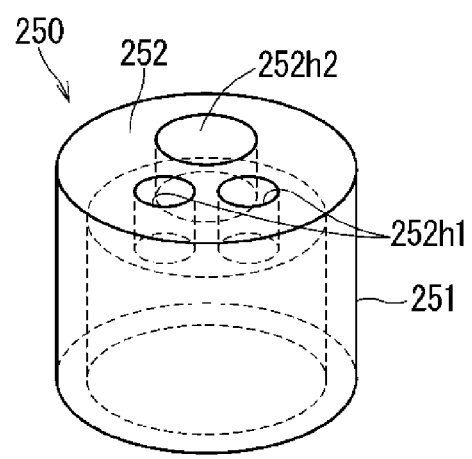
FIG. 6 is a perspective view showing a water sealing portion according to a modification.

In the embodiment described above, an example in which the water sealing portion 50 is a member formed by molding has been described. The water sealing portion may have another configuration, and for example, may be a member in which a two-component curable resin, a moisture-curable resin, a photocurable resin, or the like is cured in a state of being attached to the branch portion to fill a portion between the branch line portions. Alternatively, as shown in FIG. 6, a water sealing portion 250 corresponding to the water sealing portion 50 may be made of an elastic member such as rubber. In this case, the water sealing portion 250 may have a shape in which an opening on one side of a tube portion 251 is closed by a lid portion 252. Holes 252$h$1 and 252$h$2 respectively corresponding to the branch line portions 26 and 28 may be provided in the lid portion 252. It is preferable that the tube portion 251 covers the end portion of the sheath 44 in a state of being in close contact with the end portion of the sheath 44. The branch line portions 26 and 28 are inserted into the holes 252$h$1 and 252$h$2, respectively, and the inner peripheral edges of the holes 252$h$1 and 252$h$2 are preferably in close contact with the outer peripheries of the branch line portions 26 and 28.

The constituent elements described in the embodiment and the modifications given above may be combined as appropriate as long as there is no contradiction therebetween.

The invention claimed is:

1. A wiring member, comprising:
   a main line portion in which a plurality of electric wires are gathered, the main line portion includes a sheath that covers the plurality of electric wires, the sheath including an end portion;
   a plurality of branch line portions formed by branching the plurality of electric wires from an end portion of the main line portion;
   a water sealing portion that closes a gap between the plurality of branch line portions at a branch portion where the plurality of branch line portions branch from the end portion of the main line portion, the end portion of the sheath is open toward the branch portion, and the water sealing portion covers the end portion of the sheath; and
   a resin portion that is molded to cover the water sealing portion in a state in which the resin portion is in close contact with an outer peripheral portion of the main line portion adjacent to the branch portion and outer peripheral portions of the plurality of branch line portions adjacent to the branch portion,
   wherein the sheath, the water sealing portion and the resin portion are made of the same resin.

2. The wiring member according to claim 1, wherein the water sealing portion is a portion molded to close the gap between the plurality of branch line portions using the branch portion as an insert portion.

3. The wiring member according to claim 1, wherein a recessed portion that partially exposes at least one line portion among the main line portion and the plurality of branch line portions is formed in the resin portion.

4. The wiring member according to claim 2, wherein a recessed portion that partially exposes at least one line portion among the main line portion and the plurality of branch line portions is formed in the resin portion.

* * * * *